3,793,311
SUBSTITUTED ANTHRANILIC ACIDS

Peter Werner Feit, Gentofte, and Ole Bent Tvaermose Nielsen, Vanlose, Denmark, assignors to Lovens kemiske Fabrik Produktionsaktieselskab, Ballerup, Denmark
No Drawing. Filed Dec. 8, 1970, Ser. No. 96,297
Claims priority, application Great Britain, Dec. 16, 1969, 61,318/69
Int. Cl. C07d 5/16, 31/34, 63/12
U.S. Cl. 260—239.6         16 Claims

ABSTRACT OF THE DISCLOSURE

The invention relates to new anthranilic acid derivatives being mono- or di-N-substituted, having an ether or thioether group in the 4-position and an alkylsulphonyl group in the 5-position, and to esters and salts thereof, the said compounds being diuretics and saluretics.

The invention also comprises a method for and intermediates in the production of the said derivatives and their salts and esters.

---

The present invention relates to a series of new compounds, to salts and esters of these compounds, and to methods for the production of the compounds.

The new compounds have the formula

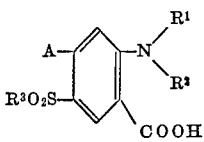

in which A represents $R^4O$ or $R^4S$, wherein $R^4$ is a $C_1$ to $C_6$ aliphatic radical or an aryl radical; $R^1$ represents a $C_1$ to $C$ aliphatic radical, or a mononuclear aralkyl radical; each of $R^2$ and $R^3$ represents a $C_1$ to $C_6$ aliphatic radical, and additionally $R^2$ can be hydrogen.

In particular, $R^1$, $R^2$, $R^3$, and $R^4$ may each represent a straight or branched alkyl radical, e.g. a methyl, ethyl, propyl, isopropyl, butyl, isobutyl, or tert.butyl radical, or one of the different isomeric pentyl or hexyl radicals.

When $R^1$ represents an aralkyl radical, the aromatic part of the radical can be a monocyclic carbocyclic aryl radical, e.g. a phenyl radical, or a heterocyclic aryl radical, e.g. a monocyclic radical containing oxygen, sulphur or nitrogen atoms as ring members, such as 2-, 3-, or 4-pyridyl, 2- or 3-furyl or -thienyl, and the aliphatic part of the radicals can contain 1 to 4 carbon atoms. Illustrative examples of such aromatically or heterocyclically substituted aliphatic radicals are benzyl, 1- or 2-phenyl-ethyl, and furyl-methyl, thienyl-methyl and the corresponding ethyl, propyl and butyl radicals. When additionally $R^4$ represents aryl radicals these can be the monocyclic radicals mentioned hereinbefore.

All the above mentioned radicals can be substituted in different positions with different groups, such as one or more halogen atoms, e.g. chlorine or bromine atoms, or alkyl, halo-alkyl, e.g. trifluoromethyl, carboxy, carbalkoxy or carbamyl radicals, di-lower alkylamino radicals, hydroxy groups, which may be etherified or esterified, etherified mercapto groups, or sulphonamide groups.

The salts of the compounds of the invention are pharmaceutically acceptable salts, and include, for example, alkali metal salts, alkaline earth metal salts, the ammonium salts, or the amine salts formed, for instance, with mono-, di-, or trialkylamines, with mono-, di-, or trialkanolamines, or with cyclic amines. The esters of the compounds are preferably derived from substitued or unsubstituted lower aliphatic alcohols, aryl- or aralkyl-alcohols, e.g. the methyl ester, the cyanomethyl ester, and the phenyl and benzyl esters.

The compounds of the invention possess valuable therapeutic properties. It is known that replacement of the sulphamyl group with an alkylsulphonyl group in the benzothiazine diuretics extremely decreases the diuretic activity, and it is, therefore, surprising that the 4-A-5-alkyl-sulphonyl-anthranilic acids of the present invention have proved to be efficacious diuretics and saluretics, having a very favorable ratio between the excretion of sodium ions and potassium ions. Furthermore the compounds are not carboanhydrase inhibitors, and these facts in connection with a favorable therapeutic index make the present compounds particularly valuable.

The present compounds are effective after oral, enteral or parenteral administration, and are preferably prescribed in the form of tablets, pills, dragées, or capsules containing the free acid or salts thereof with atoxic bases, or the esters thereof, mixed with carriers and/or auxiliary agents.

Pharmaceutical organic or inorganic solid or liquid carriers suitable for oral, enteral or parenteral administration can be used to make up compositions containing the present compounds. Gelatine, lactose, starch, magnesium stearate, talc, vegetable and animal fats and oils, gum, polyalkylene glycol, as well as other known carriers for medicaments are all suitable as carriers.

The compositions may further contain other therapeutic compounds applied in the treatment of, for example, odema and hypertension, besides the well known auxiliary agents; such other compounds may be, for instance, Veratrum- or Rauwolfia alkaloids, e.g. reserpine, rescinnamine or protoveratrine, or synthetic hypotensive compounds, e.g. hydralazine. Potassium-sparing diuretics, e.g. triamterene, may also be used in the preparation of the compositions. For some purposes it may be desirable to add small amounts of aldosterone antagonists, e.g. spironolactone.

Salts, which are soluble in water, may advantageously be administered by injection. The pharmaceutical preparations are useful in the treatment of oedematous conditions, e.g. cardiac, hepatic, renal, lung, and brain oedema, or oedematous conditions during pregnancy, and of pathological conditions which produce an abnormal retension of the electrolytes of the body, and in the treatment of hypertension.

A convenient method of preparing the compounds of the invention is according to the following reaction scheme:

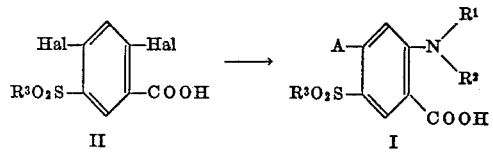

in which formulae the substituents A, $R^1$, $R^2$, and $R^3$ are as defined before, and Hal stands for the same or different halogen atoms, preferably chlorine or fluorine.

The conversion of the compounds of Formula II into the compounds of the invention may be effected by replacing the halogen atoms in two steps by the groups —A and —$NR^1R^2$, respectively. The activating influence of the $R^3O_2S$— group and the carboxylic acid group on the halogen atoms and the choice of a particular pair of halogen atoms will determine which of the two halogens will first be replaced. Thus, two intermediates of the Formulae IIIa and IIIb are obtainable:

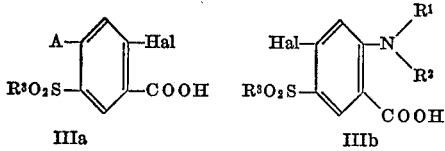

IIIa                IIIb in which formulae the substituents are as defined above, and each of which can be converted into the compounds of the invention in a subsequent step.

The starting compounds of Formula II can be prepared from the known 2,4-dihalo-5-chlorosulphonyl-benzoic acids by treatment with an excess of sodium sulphite in an aqueous, slightly alkaline solution at room temperature or at slightly elevated temperature. The resulting 2,4-dihalo-5-sulphino-benzoic acid is then treated—preferably in the form of a salt—with a dialkylsulfate or a compound of the formula $R^3X$, $R^3$ being as defined above, and X being a halogen atom, preferably iodine, by a method well-known from the alkylations of sulphinic acids, whereby a compound of Formula II is obtained, either in free form or in form of a salt or an ester, which may be hydrolyzed or may be used in the following reaction step.

When the halogen atoms are different, the preferred intermediates are those in which the reactivity of the halogen atom in the 4-position is more pronounced than that of the halogen atom in the 2-position. Particularly useful are the compounds of Formula II, in which the halogen atom in the 2-position is chlorine and that in the 4-position is fluorine. The reaction of a compound of this type with a compound of the formula A–H, A being as hereinbefore defined, results in the compounds of the General Formula IIIa. The reaction can be performed by heating the two components, preferably in the presence of an organic or inorganic base and, if desired, in the presence of water or a suitable organic solvent or mixtures thereof. The isolation of the reaction products can be performed by well-known standard procedures.

The reaction between the Compound IIIa and an amine $HN—R^1R^2$ is effected by heating the components, if necessary in the presence of an inert organic solvent, using preferably an excess of two or more equivalents of the amine. The temperature depends on the amine used in the process and will in most cases preferably be about the boiling point of the amine or the solvent used.

The reaction between the Compounds IIIb and the compounds A—H can be performed under reaction conditions The reaction between the Compounds IIIb and the Compounds IIIa.

Particularly when Hal stands for fluorine in Formula IIIb, both the free anthranilic acid and derivatives thereof react under mild conditions with compounds of Formula A—H to form the compounds of the invention. The compounds of the invention in which $R^2$ is hydrogen can be alkylated to other compounds of Formula I using standard procedures, and some of the latter can be subjected to a dealkylation resulting in compounds of the invention in which $R^2$ is hydrogen.

The reaction products can be isolated in known manner. If the products are obtained as salts, the free acids can be isolated by acidfying a solution of the salt and precipitating the compound in usual manner, and vice versa the free acids can be converted into salts.

Likewise, if the products are obtained as esters, the free acids may be obtained by a hydrolysis, and vice versa the free acids can be esterified in known manner.

Another object of the invention resides in the selection of a dose of one of the compounds of the invention, which can be administered so that the desired activity is achieved without simultaneous secondary effects. By the term "dosage unit" is meant a unitary, i.e. a single dose capable of being administered to a patient, and which may readily be handled and packed, remaining as a physically stable unit dose, comprising either the active material as such or a mixture of it with a pharmaceutical carrier and auxiliary agents.

In the form of a dosage unit, the compounds may be administered one or more times a day with appropriate intervals, always depending, however, on the condition of the patient. In such a dosage unit, the compound is conveniently administered as a pharmaceutical composition containing from 1 mg. to 50 mg. of the active compound. The preferred compounds of Formula I used in the composition are those in which $R^1$ is an alkyl group with from 4 to 6 carbon atoms, or an aralkyl radical, in particular benzyl or furylmethyl, and in which $R^2$ is hydrogen, $R^3$ preferably being a methyl group.

The following examples, which are not to be considered limiting to the scope of the invention, illustrate the preparation of the present compounds.

EXAMPLE 1

5-methylsulphonyl-4-phenoxy-N-benzyl-anthranilic acid (A) Mono-sodium salt of 2-chloro-4-fluoro-5-sulphino-benzoic acid.—Sodium sulphite (15 g.) is added to water (60 ml.) and, while stirring and keeping the temperature between 15 and 20° C., 2-chloro-5-chlorosulphonyl-4-fluoro-benzoic acid (11 g.) is added in portions during 1.5 hours. The reaction mixture is kept at pH 8 by adding 2 N sodium hydroxide via an automatic end-point titrator. After the base consumption has ceased, the monosodium salt of 2-chloro-4-fluoro-5-sulphino-benzoic acid is precipitated from the solution by addition of concentrated hydrochloric acid to pH 1.5 at 5° C. The acidic salt is collected by filtration and has, after drying, a melting point of 223° C. (dec.). After recrystallization from 50% ethanol the melting point is unchanged.

(B) Methyl 2-chloro - 4 - fluoro - 5 - methylsulphonyl-benzoate.—A solution of 2-chloro-4-fluoro-5-sulphino-benzoic acid mono-sodium salt (5.4 g.), sodium (0.6 g.), and methyl iodide (15 ml.) in methanol (25 ml.) is refluxed for 60 hours. After cooling, the resulting crystalline material is filtered off and washed with cold methanol. After drying, methyl 2-chloro-4-fluoro-5-methylsulphonyl-benzoate is obtained with a melting point of 131–134° C.

Recrystallization from methanol raises the melting point to 134.5–136° C.

(C) Methyl 2-chloro-5-methylsulphonyl - 4 - phenoxy-benzoate.—A solution of methyl 2-chloro-4-fluoro-5-methylsulphonyl-benzoate (2.67 g.), phenol (1.25 g.), and sodium (0.23 g.) in tert.butanol (25 ml.) is heated on a steam bath for 3 hours. After cooling, the mixture is diluted with water (25 ml.), and the resulting precipitate is filtered off and washed with water. After drying, methyl 2-chloro-5-methylsulphonyl-4-phenoxy - benzoate is obtained with a melting point of 138–139° C. Recrystallization from methanol raises the melting point to 139–140° C.

(D) Methyl 5-methylsulphonyl - 4 - phenoxy-N-benzyl-anthranilate.—A mixture of methyl 2-chloro-5-methylsulphonyl-4-phenoxy-benzoate (1.2 g.) and benzylamine (5.0 ml.) is heated on a steam bath for 3 hours. The mixture is then poured into 4 N acetic acid (20 ml.), and the resulting precipitate is filtered off and washed with water. After drying, crude methyl 5-methylsulphonyl-4-phenoxy-N-benzyl-anthranilate with a melting point of about 130° C. is obtained. Once repeated recrystallization from methanol raises the melting point to 147–149° C.

(E) 5-methylsulphonyl - 4 - phenoxy-N-benzyl-anthranilic acid.—A mixture of methyl 5-methylsulphonyl-4-phenoxy-N-benzyl-anthranilate (1.2 g.), N sodium hydroxide (10 ml.), and methyl Cellosolve (15 ml.) is heated on a steam bath for 1 hour. The resulting clear solution is cooled and then acidified with 4 N hydrochloric acid (6.5 ml.). The precipitate is filtered off and washed with water. It is then extracted with hot 1 N sodium hydrogen carbonate (20 ml.), filtered, and reprecipitated with 4 N hydrochloric acid (7 ml.). The resulting crystalline material is filtered off and washed with water. After drying, 5-methylsulphonyl-4-phenoxy-N-benzyl-anthranilic acid is obtained with a melting point of 198–200° C. (dec.). Recrystallization from ethanol raises the melting point to 210–212° C. (dec.).

EXAMPLES 2–4

Following the procedure of Example 1, steps (D) and (E), and replacing the benzylamine by n-butylamine, 2-chlorobenzylamine and 3-methylbenzylamine, respectively, the corresponding 5-methylsulphonyl-4-phenoxy-N-n-butyl-, -N-(2'-chlorobenzyl)-, and -N-(3'-methylbenzyl)-anthranilic acids are obtained with melting points of 172–174° C. (dec.), 230–231.5° C., and 195–196° C., respectively.

EXAMPLE 5

5-methylsulphonyl-4-phenoxy-N-[furyl-(2)-methyl]-anthranilic acid

Methyl 2-chloro - 5 - methylsulphonyl-4-phenoxy-bendroxide (10 ml.), and methylCellosolve (15 ml.) is heated on a steam bath for 3 hours. The mixture is then poured into 4 N acetic acid (20 ml.). The resulting amorphous crude methyl 5-methylsulphonyl-4-phenoxy-N-[furyl-(2)-methyl]-anthranilate is filtered off and washed with water. The partially dried material is dissolved in methanol (20 ml.), and 4 N sodium hydroxide (5 ml.) is added. The mixture is then heated on a steam bath, allowing the methanol to distill off slowly. After about 20 minutes, water (10 ml.) is added, and the solution is filtered hot. After cooling, the separated sodium 5-methylsulphonyl-4-phenoxy-N-[furyl-(2)-methyl]-anthranilate is filtered off and washed with cold water, cold ethanol, and diethyl ether. The salt is then dissolved in hot water (10 ml.), and the solution is acidified with acetic acid (1 ml.). The resulting crystalline material is filtered off and washed with water. After drying, 5-methylsulphonyl-4-phenoxy-N-[furyl-(2)-methyl]-anthranilic acid is obtained with a melting point of about 236° C. (dec.). Recrystallization from a mixture of ethanol and methylCellosolve raises the melting point to 239–241° C. (dec.).

EXAMPLE 6

5-methylsulphonyl-4-phenoxy-N,N-di-n-butyl-anthranilic acid

A solution of methyl 2-chloro-5-methylsulphonyl-4-phenoxy-benzoate (1.2 g.) and di-n-butylamine (4.8 ml.) in N-methyl-2-pyrrolidone (5 ml.) is heated on a steam bath for 72 hours. 2 N sodium hydroxide (12 ml.) is then added, and the mixture is stirred at 100° C. for 1 hour. After cooling, the aqueous layer is separated and acidified with hydrochloric acid. The resulting precipitate is collected and washed with water. After drying and recrystallizing twice from aqueous ethanol, 5-methylsulphonyl-4-phenoxy-N,N-di-n-butyl-anthranilic acid is obtained with a melting point of 125.5–128° C.

EXAMPLE 7

5-methylsulphonyl-4-phenylthio-N-[furyl-(2)-methyl]-anthranilic acid (A) Methyl 2-chloro-5-methylsulphonyl-4-phenylthio-benzoate.—A solution of methyl 2-chloro-4-fluoro-5-methylsulphonyl-benzoate (2.67 g.), thiophenol (1.5 ml.), and sodium (0.23 g.) in tert.butanol (25 ml.) is heated on a steam bath for 3 hours. After cooling, the mixture is diluted with water (25 ml.), and the resulting precipitate is filtered off and washed with water. After drying, crude methyl 2-chloro-5-methylsulphonyl-4-phenylthio-benzoate is obtained with a melting point of 135–136° C. Recrystallization from methanol raises the melting point to 144.5–145.5° C.

(B) 5-methylsulphonyl-4-phenylthio-N - [furyl - (2)-methyl]-anthranilic acid.—A mixture of methyl 2-chloro-5-methylsulphonyl-4-phenylthio-benzoate (1.4 g.) and furfurylamine (6.0 ml.) is heated on a steam bath for 3 hours. The mixture is then poured into 4 N acetic acid (25 ml.). The precipitated amorphous crude methyl 5-methylsulphonyl-4-phenylthio-N-[furyl-(2)-methyl]-anthranilate is filtered off and is washed with water. The partially dried material is dissolved in methanol (40 ml.), and 4 N sodium hydroxide (5 ml.) is added. The mixture is then heated on a steam bath, allowing the methanol to distill off slowly. After about 30 minutes, water (10 ml.) and decolorizing carbon is added, and the solution is filtered hot. To the cooled solution, acetic acid (3 ml.) is added, and the resulting precipitate is filtered off and washed with water. After drying, crude 5-methylsulphonyl-4-phenylthio-N-[furyl-(2)-methyl]-anthranilic acid is obtained with a melting point of 223° C. (dec.). Recrystallization from a mixture of ethanol and methylCellosolve raises the melting point to 243–254° C. (dec.).

EXAMPLE 8

5-methylsulphonyl-4-phenoxy-N-benzyl-anthranilic acid (A) Mono-sodium salt of 2,4-dichloro-5-sulphino-benzoic acid.—By replacing the 2-chloro-4-fluoro-5-chlorosulphonyl-benzoic acid in Example 1, step (A), by 2,4-dichloro-5-chlorosulphonyl-benzoic acid, the mono-sodium salt of 2,4-dichloro-5-sulphino-benzoic acid is obtained as a trihydrate with a melting point of 229–230° C. (dec.).

(B) Methyl 2,4-dichloro-5-methylsulphonyl-benzoate.— By replacing the mono-sodium salt of 2-chloro-4-fluoro-5-sulphino-benzoic acid in Example 1, step (B), by the mono-sodium salt of 2,4-dichloro-5-sulphino-benzoic acid (dried in vacuo at 115° C. for about 20 hours), methyl 2,4-dichloro-5-methylsulphonyl-benzoate is obtained with a melting point of 152–154° C.

(C) Methyl 4-chloro-5-methylsulphonyl - N - benzyl-anthranilate.—A solution of methyl 2,4-dichloro-5-methylsulphonyl-benzoate (11 g.) and benzylamine (24 ml.) in methanol (400 ml.) is refluxed for 22 hours. The solution is then concentrated in vacuo to about 100 ml. and left in a refrigerator for about 2 hours. The resulting precipitate is collected by filtration and washed with cold methanol. After drying and recrystallization from ethanol, methyl 4-chloro-5-methylsulphonyl-N-benzyl-anthranilate is obtained with a melting point of 134–135° C.

(D) 5-methylsulphonyl-4-phenoxy-N-benzyl-anthranilic acid.—To a solution of sodium (0.14 g.) in ethanol (10 ml.), phenol (0.62 g.) is added, and the solution is evaporated in vacuo. The resulting sodium phenoxide is dissolved in N-methyl-2-pyrrolidone (10 ml.), and methyl 4-chloro-5-methylsulphonyl-N-benzyl-anthranilate (1.0 g.) is added. The mixture is stirred at 140° C. for about 24 hours. The mixture is then cooled, diluted with water (20 ml.), and carefully acidified with hydrochloric acid. The resulting precipitate is collected by filtration and washed with water. After drying and recrystallization from 50% ethanol, 5-methylsulphonyl-4-phenoxy-N-benzyl-anthranilic acid is obtained with a melting point of 210.5–212° C. (dec.). The material (IR, analyses) is identical with the material prepared according to Example 1, step (E).

EXAMPLES 10–14

By following the procedure described in Example 9, step (D), but replacing the phenol by the substituted phenols or thiophenols of the following Table I, the corresponding 4-A-5-methylsulphonyl-N-benzyl - anthranilic acids are obtained.

TABLE I

| Ex. No. | Substituted phenol or thiophenol | 4-substituent (A) | M.P., ° C. |
|---|---|---|---|
| 9 | 4-chlorophenol | 4'-chlorophenoxy | 221–222.5 |
| 10 | 3-methylphenol | 3'-methylphenoxy | 241.4–242 (dec.) |
| 11 | 4-methoxyphenol | 4'-methoxyphenoxy | 213.5–214.5 |
| 12 | Thiophenol | Phenylthio | 236–263.5 (dec.) |
| 13 | 3-methylthiophenol | 3'-methylphenylthio | 269.5–270 (dec.) |

EXAMPLE 14

4-n-butyloxy-5-methylsulphonyl-N-benzyl-anthranilic acid (A) n-Butyl 4-n-butyloxy-5-methylsulphonyl-N-benzyl-anthranilate.—To a solution of sodium (0.19 g.) in n-butanol (10 ml.), methyl 4-chloro-5-methylsulphonyl-N-benzyl-anthranilate is added and the mixture is heated on a steam bath for 2.5 hours. After cooling, the separated material is collected by filtration and washed with water. After drying and recrystallization, from methanol, n-butyl 4-n-butoxy-5-methyl-sulphonyl-N-benzyl - anthranilate is obtained with a melting point of 127.5–129° C.

(B) 4-n-butyloxy-5-methylsulphonyl-N-benzyl-anthranilic acid.—A mixture of n-butyl 4-n-butyloxy-5-methylsulphonyl-N-benzyl-anthranilate (0.35 g.) and 2 N sodium hydroxide (3.5 ml.) is heated on a steam bath for 30 minutes. The resulting solution is acidified with 4 N hydrochloric acid (2.0 ml.), and the precipitated material is collected by filtration and washed with water. After drying and recrystallization from ethanol, 4-n-butyloxy-5-methylsulphonyl-N-benzyl-anthranilic acid is obtained with a melting point of 207.5–209.5° C.

EXAMPLE 15

5-methylsulphonyl-4-phenoxy-N-n-butyl-anthranilic acid

A mixture of methyl 2-chloro-5-methylsulphonyl-4-phenoxy-benzoate (1.2 g.) and n-butylamine (4.8 ml.) is heated on a steam bath for 1 hour and is then evaporated in vacuo. To the residue, 2 N sodium hydroxide (12 ml.) is added, and the mixture is heated on a steam bath for 1 hour. After cooling, the mixture is acidified with hydrochloric acid, and the precipitated semi-solid material is triturated with 50% ethanol (5 ml.). After standing in a refrigerator for 2 days, the material is collected by filtration and washed with cold 50% ethanol. After drying and recrystallizing twice from aqueous ethanol, 5-methylsulphonyl-4-phenoxy-N-n-butyl-anthranilic acid is obtained with a melting point of 172.5–175° C. (dec.). The material is identical (IR, analyses) with the material prepared according to Example 2.

EXAMPLE 16

Cyanomethyl 5-methylsulphonyl-4-phenylthio-N-benzyl-anthranilate

A solution of 5-methylsulphonyl-4-phenylthio-N-benzyl-anthranilic acid (0.62 g.), chloroacetonitrile (0.12 g.), and triethylamine (0.17 g.) in dry acetone (5 ml.) is refluxed for 3 hours. After cooling, the precipitated triethylamine hydrochloride is removed by filtration, and the filtrate is evaporated in vacuo. The residue is washed with 1 N sodium hydrogen carbonate solution (20 ml.), and the undissolved material is collected by filtration and washed with water. After drying and recrystallizing from methyl-Cellosolve, cyanomethyl 5-methylsulphonyl-4-phenylthio-N-benzyl-anthranilate is obtained with a melting point of 183.5–185° C.

We claim:
1. A compound of the formula:

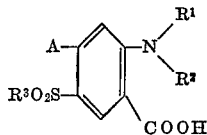

a pharmaceutically acceptable salt thereof, or an ester thereof with a lower alkanol, cyanomethanol, phenol or benzyl alcohol, wherein:

A is $R^4O$ or $R^4S$ wherein $R^4$ is a straight or branched chain alkyl radical having from 1 to 6 carbon atoms or a phenyl, 2-, 3-, 4-pyridyl, 2,3-furyl, 2- or 3-thienyl radical; and $R^1$ is a straight or branched chain alkyl radical having from 1 to 6 carbon atoms or an alkyl radical containing from 1 to 4 carbon atoms substituted with a phenyl, 2-, 3-, 4-pyridyl, 2-, 3-furyl, 2- or 3-thienyl radical; and $R^2$ and $R^3$ may be the same or different and represent a straight or branched chain alkyl radical having from 1 to 6 carbons, with the proviso that $R^2$ may also be a hydrogen atom.

2. A compound according to claim 1, in which $R^1$ is a phenylalkyl radical, $R^2$ is hydrogen and $R^3$ is methyl.

3. A compound according to claim 1, in which $R^1$ is an alkyl radical, $R^2$ is hydrogen and $R^3$ is methyl.

4. A compound according to claim 1 in which $R^1$ is a methyl radical substituted with a 2-, 3-, 4-pyridyl, 2-, 3-furyl, 2- or 3-thienyl radical, $R^2$ is hydrogen and $R^3$ is methyl.

5. A compound according to claim 1, in which $R^1$ is benzyl and $R^2$ is hydrogen.

6. A compound according to claim 1, in which A is phenoxy, $R^1$ is a phenylalkyl radical and $R^2$ and $R^3$ are lower alkyl.

7. A compound according to claim 1, in which A is phenoxy, $R^1$ is a phenylalkyl radical, $R^2$ is hydrogen and $R^3$ is methyl.

8. A compound according to claim 1, in which A is phenylthio and $R^1$ is a phenylalkyl radical.

9. 5-methylsulphonyl - 4 - phenoxy-N-benzyl-anthranilic acid; a pharmaceutically acceptable salt thereof or an ester thereof with a lower alkanol, cyanomethanol, phenol or benzyl alcohol.

10. 5-methylsulphonyl - 4 - phenoxy-N-n-butyl-anthranilic acid; a pharmaceutically acceptable salt thereof or an ester thereof with a lower alkanol, cyanomethanol, phenol or benzyl alcohol.

11. 5-methyl - 4 -phenoxy-N-(furyl-(2)-methyl)-anthranilic acid; a pharmaceutically acceptable salt thereof or an ester thereof with a lower alkanol, cyanomethanol, phenol or benzyl alcohol.

12. 5-methylsulphonyl - 4 - phenylthio-N-(furyl-(2)-methyl)-anthranilic acid; a pharmaceutically acceptable salt thereof or an ester thereof with a lower alkanol, cyanomethanol, phenol or benzyl alcohol.

13. 4-n-butyloxy - 5 - methylsulphonyl-N-benzyl-anthranilic acid; a pharmaceutically acceptable salt thereof or an ester thereof with a lower alkanol, cyanomethanol, phenol or benzyl alcohol.

14. 5-methylsulphonyl - 4 - phenylthio-N-benzyl-anthranilic acid; a pharmaceutically acceptable salt thereof or an ester thereof with a lower alkanol, cyanomethanol, phenol or benzyl alcohol.

15. 5-methylsulphonyl - 4 - phenoxy-N-(2'halo-benzyl)-anthranilic acid; a pharmaceutically acceptable salt thereof or an ester thereof with a lower alkanol, cyanomethanol, phenol or benzyl alcohol.

16. 5-methylsulphonyl - 4 - (chloro-phenoxy)-N-benzyl-anthranilic acid; a pharmaceutically acceptable salt thereof or an ester thereof with a lower alkanol, cyanomethanol, phenol or benzyl alcohol.

References Cited

UNITED STATES PATENTS 3,577,409  5/1971  Cragoe _____ 260—239.6

OTHER REFERENCES

Morrison et al.: Organic Chemistry (Allyn and Bacon, Boston, 1959), pp. 412–4.

Fieser et al.: Advanced Organic Chemistry (Reinhold, New York, 1961), pp, 312–3.

HENRY R. JILES, Primary Examiner

C. M. S. JAISLE, Assistant Examiner

U.S. Cl. X.R.

260—239.8, 397.7; 424—228, 229